United States Patent [19]

Coil et al.

[11] 4,175,801
[45] Nov. 27, 1979

[54] BEARING HAVING A TAB

[75] Inventors: Donald A. Coil, Washington; John L. Johnson, Jr., Brimfield; Horace J. Swinland, Peoria, all of Ill.

[73] Assignee: Caterpillar Tractor Co., Peoria, Ill.

[21] Appl. No.: 930,449

[22] Filed: Aug. 2, 1978

Related U.S. Application Data

[63] Continuation of Ser. No. 813,586, Jul. 7, 1977, abandoned.

[51] Int. Cl.$^2$ ............................................. F16C 3/06
[52] U.S. Cl. ..................................... 308/23; 308/167; 308/237 R
[58] Field of Search ............ 308/23, 167, 179, 179.5, 308/23.5, 237, 164, 163, 161, 162, 168–172; 29/148.5 R; 74/594.1; 123/196 R

[56] References Cited

U.S. PATENT DOCUMENTS

| 3,713,714 | 1/1973 | Hill et al. | 308/237 R |
| 4,017,127 | 4/1977 | Smith et al. | 308/23 |

FOREIGN PATENT DOCUMENTS 806373 12/1958 United Kingdom ..................... 308/167

Primary Examiner—Douglas C. Butler
Attorney, Agent, or Firm—John L. James

[57] ABSTRACT

A bearing has a body, a surface and a tab extending from the body. The tab is of a construction sufficient for insertion of the bearing into a preselected cavity of preselected configuration defined by first and second members only with the bearing surface oriented in a preselected direction.

15 Claims, 6 Drawing Figures

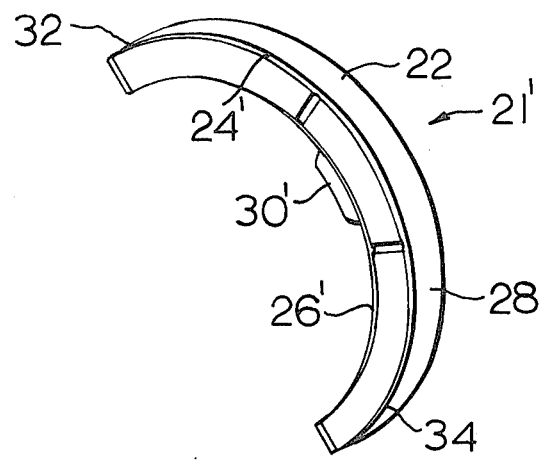
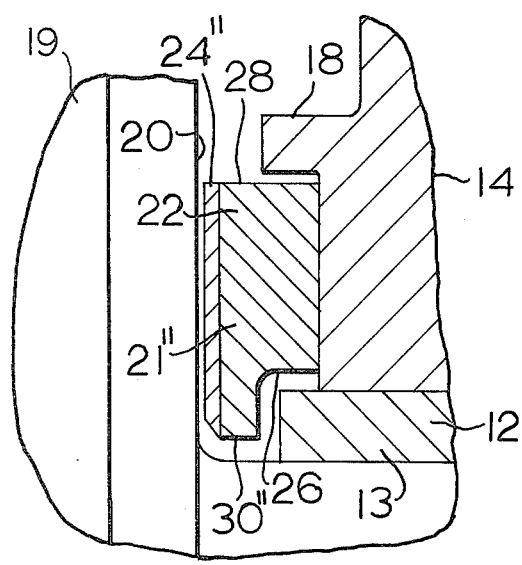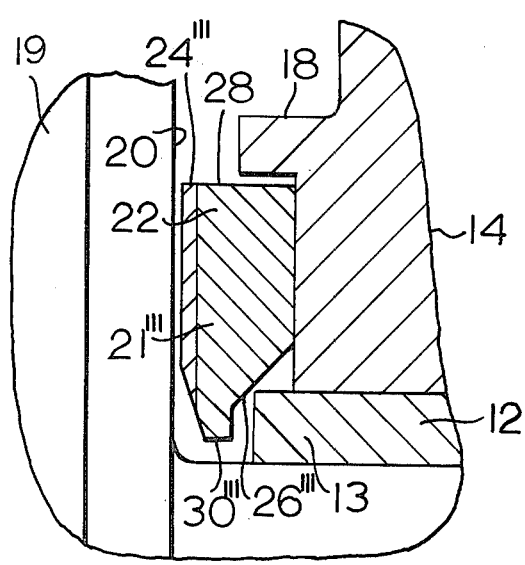

BEARING HAVING A TAB

This is a continuation of application Ser. No. 813,586, filed July 7, 1977, now abandoned.

BACKGROUND OF THE INVENTION

Machine assemblies, such as an automotive crankshaft and journal bearing assembly for example, use thrust bearings for limiting motion. The thrust bearing is inserted in a cavity between the crankshaft, engine block and main journal bearing to limit motion along the longitudinal axis of the crankshaft. The thrust bearing has two sides with bearing surface material on one surface only. The bearing is sometimes inadvertently inserted incorrectly with the bearing surface towards the engine block surface instead of the crankshaft thrust face or cheek which damages the crankshaft and bearings. It is desirable to have a thrust bearing with only one bearing surface which cannot be inserted incorrectly.

SUMMARY OF THE INVENTION

The present invention is directed to overcoming one or more of the problems as set forth above.

According to the present invention, a bearing comprises a body having a periphery and a surface and at least one tab extending from the periphery. The tab has a different cross sectional dimension than the body and has a construction sufficient for insertion of the bearing into a cavity defined by first and second members with the bearing surface oriented toward a preselected one of the first and second members.

BRIEF DESCRIPTION OF THE DRAWINGS

FIG. 4 is an isometric view of an embodiment of the present invention;

FIG. 5 is an enlarged cross sectional view of the embodiment of FIG. 4; and

FIG. 6 is an enlarged cross sectional view of an embodiment of the present invention similar to FIG. 5.

DETAILED DESCRIPTION

Figure 1:
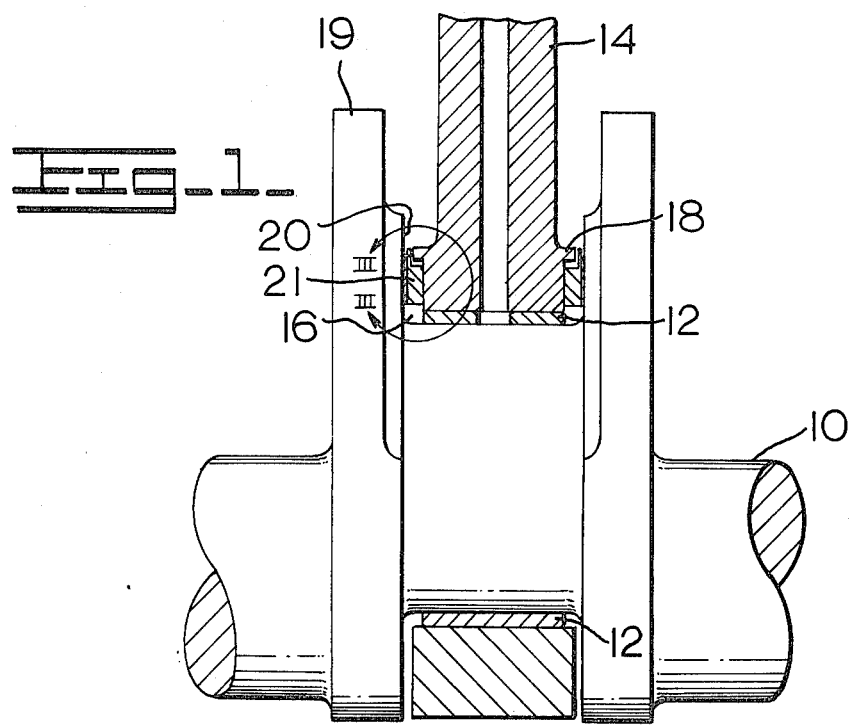
FIG. 1 is cross sectional view of the present invention.

Referring to FIG. 1, a crankshaft 10, journal bearing 12 and engine block 14 define a cavity 16. The block 14 has a protrusion 18 which extends toward a lobe 19 and cheek 20 or thrust face of the crankshaft 10. The journal bearing 12 abuts the block 14 and is preferably generally flush therewith (FIG. 3), and end portion 13 can extend to a location generally flush with the protrusion 18 (FIGS. 5, 6). The shape of the cavity 16 is influenced by the relationship of the bearing 12, crankshaft cheek 20 and block 14.

Figure 2:
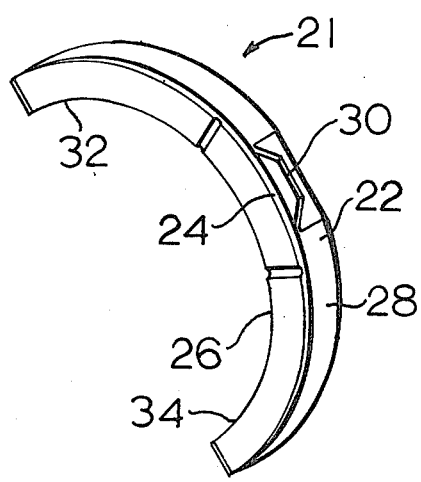
FIG. 2 is an isometric view of the present invention.
Figure 3:
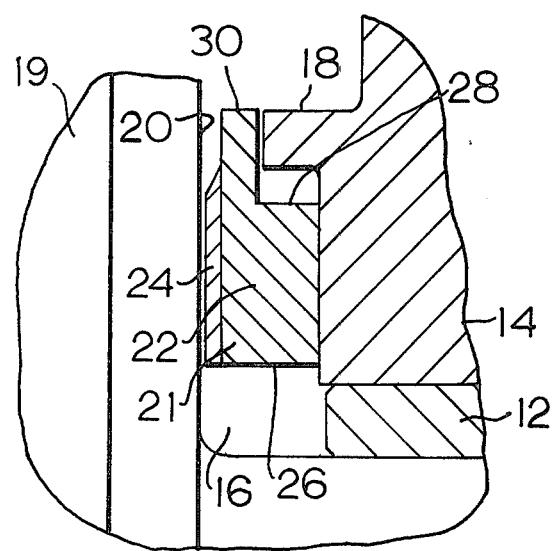
FIG. 3 is an enlarged cross sectional view similar to FIG. 1.

Referring to FIGS. 2 and 3, a bearing 21, preferably a thrust bearing such as a washer, is positioned in the cavity 16. The washer 21 has a body portion 22, a bearing surface 24, inner and outer peripheries 26, 28 and at least one tab 30 adjacent the surface 24. The tab 30 preferably extends outwardly from the outer periphery 28 in opposed relation to the inner periphery 26. The tab 30 is preferably of a smaller cross sectional dimension than the body 22 of the washer 21 and is of a construction sufficient for insertion of the washer 21 into the cavity 16 with the surface 24 oriented only toward the crankshaft cheek 20 defining the cavity 16. The tab 30 prevents insertion in any other manner by abutting the protrusion 18 and preventing the body 22 of the washer 21 from entering the cavity 16.

The tab 30 abuts the washer surface 24 which is preferably a bearing surface. The tab 30 and washer 21 are preferably constructed of steel and the surface 24 is preferably bonded bearing material such as aluminum. The tab 30 is spaced a preselected distance from the engine block protrusion 18 when the washer body 22 and engine block 14 are in abutting contact.

Reference numerals in FIGS. 4, 5 and 6 are designed by "'", "''", and "'''" respectively to indicate the parts of FIGS. 1–3 which differ structurally.

The washer 21 has an arcuate configuration, preferably semi-circular, and has first and second end portions 32, 34 (FIGS. 2, 4). The end portions 32, 34 are preferably tapered. The tab 30 is preferably spaced a preselected distance from the end portions 32, 34. The tab 30 can extend radially outward from the outer peripheral surface 28 or inwardly from inter peripheral surface 26 from the first end portion 32 to the second end portion 34. There can be more than one tab 30.

Referring to FIGS. 4–6, the tab 30 can extend inwardly from the inner periphery 26 in opposed relation to the outer periphery 28. The tab 30 can be tapered adjacent the surface 24 (FIG. 6) and the body 22 can be tapered adjacent the tab 30. The surface 24 can be tapered adjacent the tab 30 (FIG. 5).

In operation, an assembler inserts the thrust bearing 21 into the cavity 16 with the surface 24 adjacent the crankshaft cheek 20. If the assembler attempts to insert the thrust bearing 21 with the bearing surface 24 adjacent the engine block 14, the tab 30 abuts the engine block protrusion 18 or the journal bearing end portion 13 and prevents incorrect insertion.

Other aspects, objects and advantages will become apparent from a study of the specification, drawings and appended claims.

The embodiments of the invention in which an exclusive property or privilege is claimed are defined as follows:

1. A bearing insertable into a cavity of preselected configuration defined by structure including first and second members, said structure defining a reduced cross-sectional area of said cavity at a preselected location of said structure, comprising:
    a body having a periphery and being positionable in contact with one of the first and second members in response to inserting said bearing into the cavity;
    a surface on said body; and
    at least one tab extending from said periphery adjacent said surface, said tab being of a different cross-sectional dimension than said body and of a construction sufficient for insertion into said preselected cavity at said reduced cross-sectional area for insertion of said bearing into said preselected cavity with said surface oriented toward only a preselected one of the first and second members, and being free from engagement with said structure and spaced a preselected distance from said structure at the preselected location in response to said body of the bearing being in contact with the other one of the preselected one of said first and second members.

2. A bearing, as set forth in claim 1, including a second periphery, one of said periphery and second periphery being an inner periphery and the other being an outer periphery, said tab extending from one of said inner and outer periphery in a direction away from the other.

3. A bearing, as set forth in claim 1, wherein said surface abuts said tab.

4. A bearing, as set forth in claim 1, wherein said tab is tapered adjacent said surface.

5. A bearing, as set forth in claim 1, wherein said bearing is arcuately shaped and has first and second end portions.

6. A bearing, as set forth in claim 5, wherein said tab is spaced a preselected distance from said end portions.

7. A bearing, as set forth in claim 5, wherein said first and second end portions are tapered.

8. A bearing, as set forth in claim 1, wherein said body is tapered adjacent said tab.

9. A bearing, as set forth in claim 1, wherein said first and second members are a crankshaft and engine block, respectively.

10. A bearing, as set forth in claim 9, wherein said structure includes a journal bearing having an end portion.

11. A bearing, as set forth in claim 10, wherein said end portion of the journal bearing extends outwardly from said engine block toward a lobe and cheek of the crankshaft and defines said preselected location of the structure.

12. A bearing, as set forth in claim 9, wherein said engine block has a protrusion extending toward a lobe and cheek of the crankshaft and defining said preselected location of the structure.

13. A bearing, as set forth in claim 1, wherein said body of the bearing is positionable in contact with the one of the first and second members at a location on said body spaced from said surface on said body.

14. A bearing insertable into a cavity of preselected configuration defined by structure including first and second members, said structure defining a reduced cross-sectional area of said cavity at a preselected location of said structure, comprising:

a body having a periphery and being positionable in contact with one of the first and second members in response to inserting the bearing into the cavity;

a surface on said body; and means for abutting one of the first and second members and preventing insertion of the bearing into the cavity except with the surface of the bearing oriented toward only a preselected one of the first and second members, said means including at least one tab extending from said periphery adjacent said surface, said tab being of a different cross-sectional dimension than said body and of a construction sufficient for insertion into said preselected cavity at said reduced cross-sectional area for insertion of said bearing into said preselected cavity with said surface oriented toward only the preselected one of the first and second members, and being free from engagement with said structure and spaced a preselected distance from said structure at said preselected location in response to said body of the bearing being in contact with the other one of the preselected one of said first and second members.

15. A bearing insertable into a cavity of preselected configuration defined by a crankshaft, a journal bearing and an engine block, said engine block having a protrusion extending toward a lobe and cheek of the crankshaft, said journal bearing having an end portion, one of said protrusion and said end portion of the journal bearing defining a reduced cross-sectional area of said cavity, comprising:

a body having a periphery and being positionable in contact with one of said engine block and cheek of the crankshaft in response to inserting the bearing into the cavity;

a single surface on said body; and means for abutting one of the engine block protrusion and journal bearing end portion and preventing insertion of the bearing into the cavity except with said surface of the bearing oriented toward only a preselected one of the engine block and crankshaft cheek, said means including at least one tab extending from said periphery adjacent said surface, said tab being of a different cross-sectional dimension than said body and of a construction sufficient for insertion into said preselected cavity at said reduced cross-sectional area for insertion of said bearing into said preselected cavity with said surface oriented toward only the preselected one of the engine block and crankshaft cheek, and being free from engagement with said journal bearing, crankshaft and engine block and spaced a preselected distance from the one of said engine block protrusion and said end portion of the journal bearing defining said reduced cross-sectional area in response to said body of the bearing being in contact with the other one of the preselected one of said engine block and said cheek of the crankshaft.

* * * * *